(12) United States Patent
Kimura et al.

(10) Patent No.: US 8,290,344 B2
(45) Date of Patent: Oct. 16, 2012

(54) VIDEO RECORDING/REPRODUCING APPARATUS AND A TELEVISION RECEIVER INCLUDING THE SAME THEREIN

(75) Inventors: Katsunobu Kimura, Yokohama (JP); Yasushi Naito, Yokohama (JP); Satoshi Takahashi, Chigasaki (JP); Satoshi Iimuro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1075 days.

(21) Appl. No.: 11/641,768

(22) Filed: Dec. 20, 2006

(65) Prior Publication Data

US 2007/0230894 A1 Oct. 4, 2007

(30) Foreign Application Priority Data

Apr. 3, 2006 (JP) ................................ 2006-101358

(51) Int. Cl.
*H04N 5/94* (2006.01)
(52) U.S. Cl. ...................................................... 386/249
(58) Field of Classification Search .................. None
See application file for complete search history.

(56) References Cited

U.S. PATENT DOCUMENTS

| 7,254,318 | B2 * | 8/2007 | Imada et al. | 386/329 |
|---|---|---|---|---|
| 2003/0208771 | A1 | 11/2003 | Hensgen | |
| 2005/0213932 | A1 | 9/2005 | Yuri et al. | |
| 2005/0238316 | A1 * | 10/2005 | MacDonald Boyce et al. | 386/46 |
| 2006/0053467 | A1 | 3/2006 | Ikeda | |
| 2006/0056800 | A1 | 3/2006 | Shimagami et al. | |
| 2006/0078283 | A1 | 4/2006 | Lee et al. | |
| 2007/0172199 | A1 * | 7/2007 | Kobayashi et al. | 386/95 |
| 2008/0056680 | A1 | 3/2008 | Saeki | |
| 2008/0240681 | A1 | 10/2008 | Fukushima | |

FOREIGN PATENT DOCUMENTS

| CN | 1753479 | 3/2005 |
|---|---|---|
| EP | 0 917 355 | 5/1999 |
| EP | 1 014 732 | 6/2000 |
| JP | 10-106063 | 4/1998 |
| JP | 2000-308004 | 11/2000 |
| JP | 2001-251575 | 9/2001 |
| JP | 2001-298715 | 10/2001 |
| JP | 2005-086468 | 3/2005 |
| JP | 2005-277805 | 10/2005 |
| JP | 2006-014224 | 1/2006 |
| JP | 2006-14225 | 1/2006 |

(Continued)

OTHER PUBLICATIONS

Japanese Office Action dated Jan. 18, 2011; Application No. JP2006-101358 and Final Rejection dated Jan. 4, 2012; 6 pages.

(Continued)

*Primary Examiner* — William C Vaughn, Jr.
*Assistant Examiner* — Daniel Tekle
(74) *Attorney, Agent, or Firm* — Antonelli, Terry, Stout & Kraus, LLP.

(57) ABSTRACT

In a television receiver including a video recording/reproducing apparatus therein, since reduction is quick in a recording space thereof if recording the high-definition television broadcast signal as it is, even including a recording medium, such as, a HDD of large capacity, for example, video, audio and caption data are extracted within a video extract portion 3, an audio extract portion 4, a caption extract portion 5 from a MPEG2-TS (Transport Stream) signal (TS=video+audio+caption data+BML (Broadcast Markup Language)+other data), but except for the BML data. And, those data extracted are recorded in a recording/reproducing portion 7.

12 Claims, 12 Drawing Sheets

FOREIGN PATENT DOCUMENTS

| | | |
|---|---|---|
| JP | 2006-33180 | 2/2006 |
| JP | 2006-041851 | 2/2006 |
| JP | 2006-060587 | 3/2006 |
| JP | 2006-074614 | 3/2006 |
| JP | 2006-74616 | 3/2006 |
| JP | 2006-86670 | 3/2006 |
| WO | WO 2004/052009 | 6/2004 |
| WO | WO 2004/112039 | 12/2004 |
| WO | WO 2004/112039 A1 | 12/2004 |
| WO | WO 2006/001481 | 1/2006 |
| WO | WO 2006/013781 A1 | 2/2006 |

OTHER PUBLICATIONS

Japanese Office Action dated Mar. 27, 2012; Application No. JP2009-209961.

* cited by examiner

FIG.7(A)
FIG.7(B)
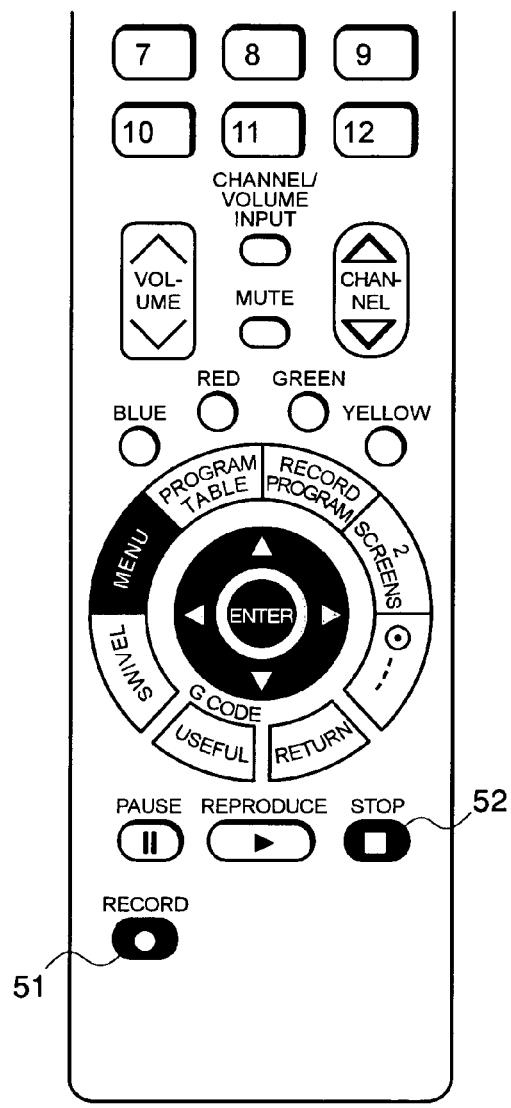
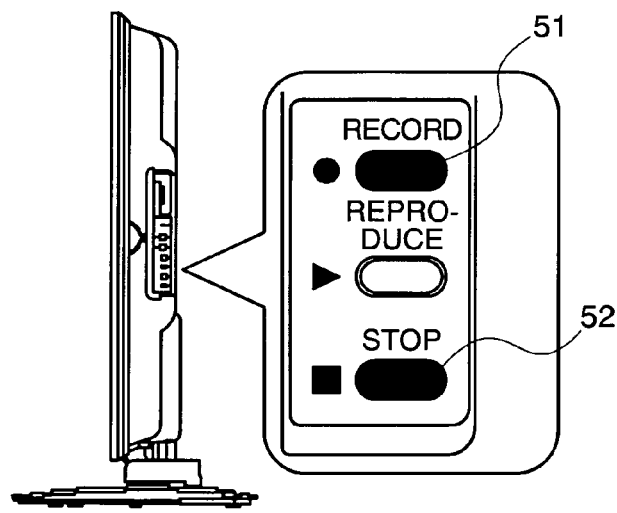

FIG.8

ORDER OF DISPLAY
----------------------------------

--

① NO DISPLAY OF QUICK TIMER
② UNTIL END OF PROGRAM
③ 30 MINUTES
④ 1 HOUR
⑤ 1 HOUR AND 30 MINUTES
⑥ 2 HOURS
⑦ 3 HOURS
⑧ 4 HOURS
⑨ 5 HOURS
⑩ 6 HOURS

----------------------------------

--

① NO DISPLAY OF QUICK TIMER
② 30 MINUTES
③ UNTIL END OF PROGRAM
④ 1 HOUR
⑤ 1 HOUR AND 30 MINUTES
⑥ 2 HOURS
⑦ 3 HOURS
⑧ 4 HOURS
⑨ 5 HOURS
⑩ 6 HOURS

FIG.11

RECORDING MODES AND
RECORDING TIMES (EXAMPLE)

| RECORDING MODE / INPUT | | DIGITAL BROADCAST | ANALOG (UHF/VHF) BROADCAST, EXTERNAL INPUT |
|---|---|---|---|
| TS | HD | ABOUT 23 HOURS | — |
| | SD | ABOUT 69 HOURS | — |
| TSE1 | | ABOUT 51 HOURS | — |
| TSE2 | | ABOUT 69 HOURS | — |
| XP (HIGH PICTURE QUALITY) | | ABOUT 51 HOURS | |
| SP (STANDARD) | | ABOUT 102 HOURS | |
| LP (LONG TIME) | | ABOUT 205 HOURS | |
| EP (LONG TIME) | | ABOUT 347 HOURS | |

VIDEO RECORDING/REPRODUCING APPARATUS AND A TELEVISION RECEIVER INCLUDING THE SAME THEREIN

BACKGROUND OF THE INVENTION (1) Field of the Invention

The present invention relates to a video recording/reproducing apparatus and a television receiver including the video recording/reproducing apparatus therein.

(2) Description of the Related Arts

Developments are made upon a video recording/reproducing apparatus for enabling to record digital broadcasting programs or a television receiver for use of broadcast having a built-in video recording/reproducing apparatus. As such the video recording/reproducing apparatus to be used therein was developed the video recording/reproducing apparatus having large capacity, applying a recording medium therein, such as, a HDD (i.e., a Hard Disk Drive), a DVD (a Digital Versatile Disc), or a Blu-ray Disc, etc., for example.

As technology for reducing data to be recorded into the video recording/reproducing apparatus, is already known, as is shown in FIG. 12, a rate conversion technology for lowering the rate of a high-definition television signal while maintaining the high-definition format thereof, for example, when recording it therein, or a size conversion technology for converting the format from the high-definition television format into a standard format being smaller in the pixel number thereof.

Also, in Japanese Patent Laying-Open No. 2006-60587 (2006) is already disclosed a recording/reproducing apparatus for recording only a first one but canceling others received thereafter, among the same data which are transmitted repetitively, for the purpose of protecting the memory capacity from being consumed unnecessarily (i.e., much more than necessity).

SUMMARY OF THE INVENTION

However, even with the recording medium, such as the HDD having the large capacity, there is a problem that a recording space thereof be reduced quickly, if recording therein the signal being large in data amount, as it is, such as, the high-definition television signal, for example. With the conventional technology of the television receiver, including the video recording/reproducing apparatus, all of the data of the signals are recorded therein.

According to the present invention, it is characterized in that, in case where a transport stream (TS), i.e., the receiving data of the digital broadcasting signal includes video data, audio data, and data for a data broadcasting described by BML (Broadcast Markup Language), for example, recording is made on the video data and the audio data, but excepting for the above-mentioned data broadcasting. In case when including a caption data within the TS, it is preferable to record the said caption data therein, too, together with the video and audio data, but it may not be recorded therein. Or, there are provided a first mode of recording the data broadcasting together with the video and audio data and a second mode of recording the video and audio data, but excepting for the data broadcasting, so that they are selectable for a use.

With such the constructions according to the present invention, it is possible to record the programs much more, into the recording medium having a limited memory capacity, maintaining high picture quality thereof.

BRIEF DESCRIPTION OF THE DRAWINGS

Those and other objects, features and advantages of the present invention will become more readily apparent from the following detailed description when taken in conjunction with the accompanying drawings wherein:

FIG. 7(A) and 7(B) are views for showing a recording button and a stop button on the remote controller and those on a main body of the television receiver;

FIG. 8 is a view for showing an example of a screen displayed when using a quick timer function;

FIG. 11 shows an example of a chart of video recording times within the video recording mode.

DETAILED DESCRIPTION OF THE INVENTION

Hereinafter, embodiments according to the present invention will be fully explained by referring to the attached drawings.

<Embodiment 1>

Figure 1:
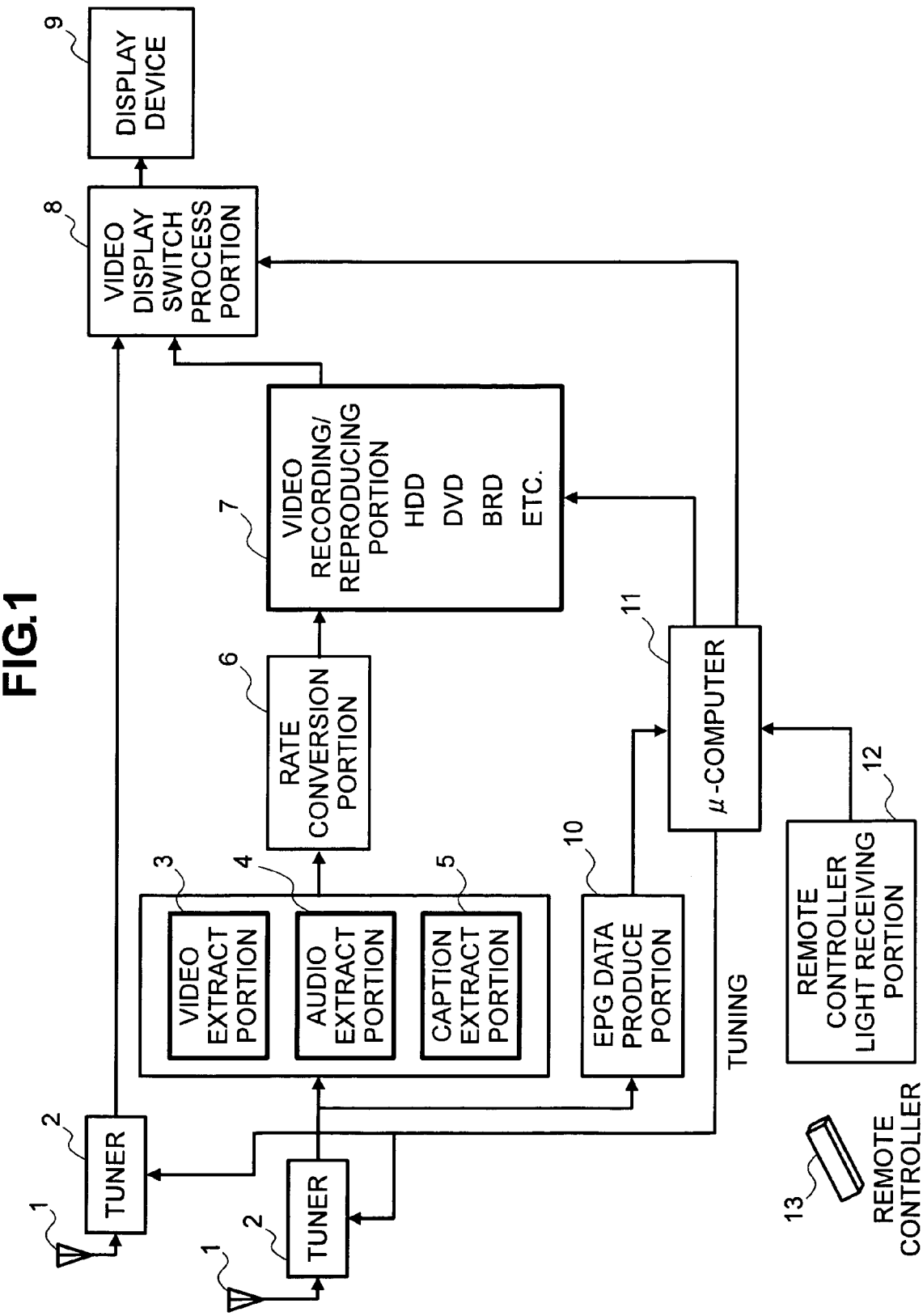
FIG. 1 is a circuit diagram of a television receiver, including therein a video recording/reproducing apparatus, according to an embodiment 1 of the present invention.
Figure 2:
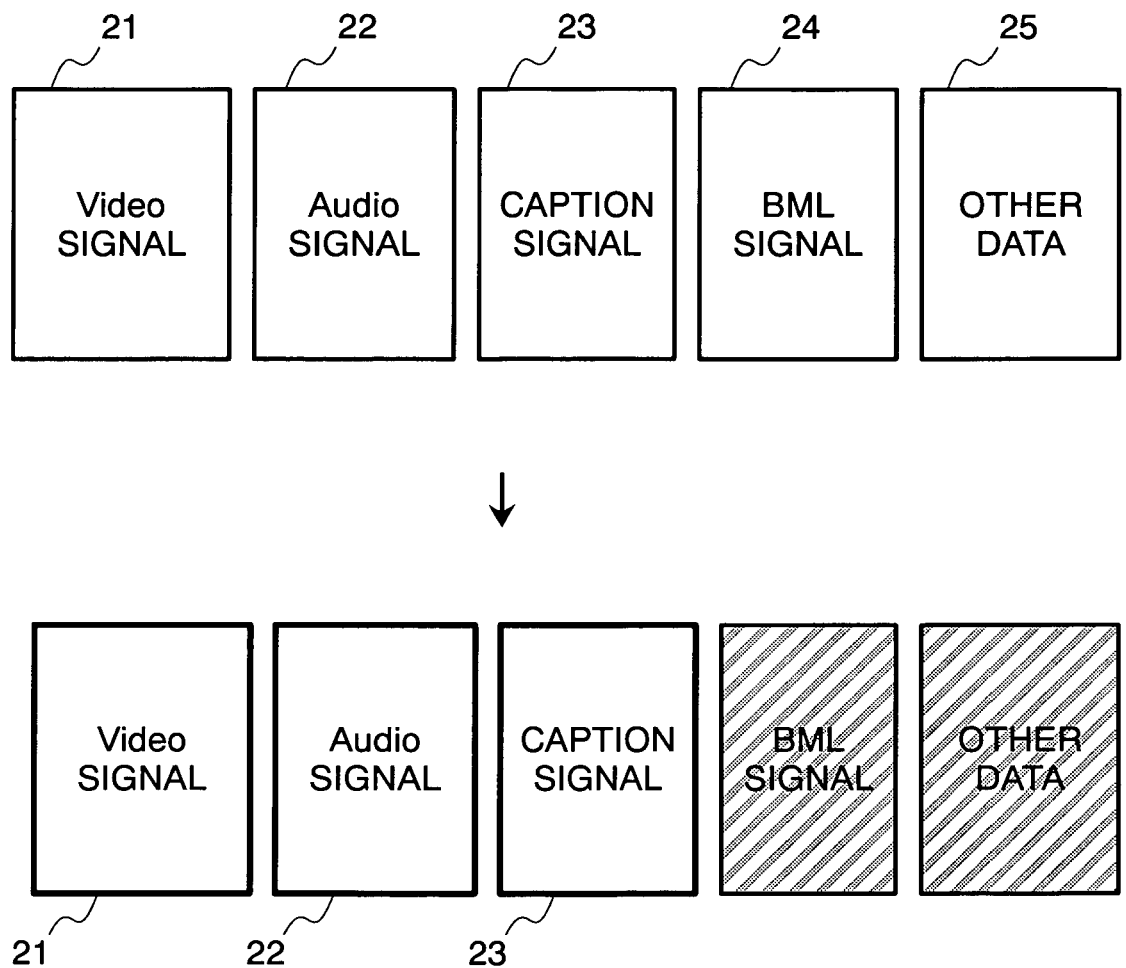
FIG. 2 is a view for showing a relationship between a MPEG2-TS (Transport Stream) signal, as being the receiving signal of the high-definition television signal and TS=video+audio+caption data, which is extracted within the embodiment 1.

FIG. 1 shows the structures of a television receiver, including therein a video recording/reproducing apparatus, according to the embodiment 1 of the present invention. Also, FIG. 2 shows the relationship between the MPEG2-TS (Transport Stream) signal, as being the receiving signal of the high-definition television signal and the TS=video+audio+caption data, which is extracted within the embodiment 1. Although the MPEG2-TS is shown as being the transport stream of the digital broadcasting signal, in the present embodiment, however it should not be limited only thereto, and therefore a data stream compressed and coded with other coding method (such as, MPEG4, etc.) may be used therein.

A video recording/reproducing apparatus shown in FIG. 1 is connected with an antenna 1, and comprises a tuner 2, a video extract portion 3, an audio extract portion 4, a caption extract portion 5, a rate conversion portion 6, a video recording/reproducing portion 7, a video display switching portion 8, a display device 9, an EPG data producing portion 10, a microcomputer 11, and a remote controller light receiving portion 12. Further, the video recording/reproducing portion, according to the present embodiment, is so structured that it can be operated by means of a remote controller 13.

In FIG. 2, within the MPEG2-TS (Transport Stream) signal are included a Video signal 21, an Audio signal 22, a caption signal 23, a BLM (Broadcast Markup Signal: data broadcasting signal) 24, and other data signals 25. As the other data signals are included a broadcasting logo ("BS-hi103") signal and/or a down load data for the TV receiver side, etc. Herein, the data broadcasting means the data described with a language called by "BML", as was mentioned above, and is for providing an audience (i.e., a user) with news, a weather forecast, market information of stock prices and/or exchanges, etc., advertisements, a bi-directional screen for responding to a questionnaire from other broadcasting station (s). This data broadcasting is displayed on the screen responding to a request made by the user, together with a picture based on the Video signal 21. Thus, in case when a request is made from the user for displaying the data broadcasting, the screen of this data broadcasting is composed or synthesized with that picture, to be displayed on the screen.

In FIG. 1, the signal received by the antenna 1 is treated with the receiving process within the tuner 2, and is displayed on the display apparatus 9 through the video display switch process portion 8. At the same time, it is possible to record the signal received by the other antenna 1 into the video recording/reproducing portion 7. Although the signal received by the other antenna 1, being treated with the receiving process within the tuner, is in the form of MPEG2-TS (Transport Stream) signal, i.e., being received data of the digital broadcasting signal, however in the embodiment 1 of the present invention, from the MPEG2-TS, a Video signal 21 is extracted within the video extract portion 3, an Audio signal 22 is extracted within the audio extract portion 4, and a caption signal 23 is extracted within the caption extract portion 5. Those Video signal 21, Audio signal 22 and caption signal 23 are combined with, to be a TS' signal (TS'=video+audio+caption data). The signal that is shown in the lower portion of FIG. 2 is that TS' signal, but it does not include the BML signal and the other data 25 therein. With such the structures, the data of the data broadcasting, which is described by the BML, is deleted from the TS' signal. Accordingly, into the video recording/reproducing portion 7 is recorded the TS' signal deleted with the data broadcasting therefrom.

As was mentioned in the above, the data broadcasting includes the news, the weather forecast, and/or the market information of stock prices and/or exchanges, etc., and those data are high in immediateness or instantaneousness, and then, many of them are only useful only on the day or the time when that they are broadcasted. On the other hand, in many cases, reproduction of the programs recorded by the user is made after elapsing a certain degree of time or several days after the recording thereof (for example, after elapsing 2-3 days from the day when recording). Then, the information of the data broadcasting, after elapsing the certain hours or days, are low in usefulness thereof for the user. Namely, may of the data broadcastings recorded are lowered down in the immediateness or instantaneousness when they are reproduced, and are not so useful for the user. For this reason, according to the present embodiment, recording is made but deleting the data broadcasting therefrom, which may be lowered down in the usefulness when being reproduced, so as to maintain the recording capacity, and thereby enabling to record the video/audio, as much as possible.

Each of the Video signal 21, the Audio signal 22, the caption signal 23, the BML signal 24 and the other data 25 is attached with ID (PID), for identifying what the data is, respectively. With using the ID mentioned above, the video extract portion 3, the audio extract portion 4 and the caption extract portion 5 identify the Video signal 21, the Audio signal 22 and the caption signal 23 from the TS, thereby to extract them, selectively.

The television receiver including the video recording/reproducing apparatus therein, according to the embodiment 1 shown in FIG. 1, comprises the video extract portion 3, the audio extract portion 4 and the caption extract portion 5, wherein only the Video signal 21, the Audio signal 22 and the caption signal 23 are extracted. However, it is further provided with a BML extract portion and other data extract portion(s), other than the video extract portion 3, the audio extract portion 4 and the caption extract portion 5, so as to extract the BML signal 24 and the other data 25, too; but it is also possible to change the structures so that the BML signal 24 and the other data 25 are not included within the TS' signal.

In this manner, according to the embodiment 1, recording only the Video signal 21, the Audio signal 22 and the caption signal 23 into the video recording/reproducing portion 7, but deleting the BML signal 24 and the other data 25 from the MPEG2-TS (Transport Stream), enables to record the programs as may as possible, with high picture quality, into a recording medium having the limited recording capacity. Although an example of providing two (2) sets of the antennas 1 and the tuners 2 is shown in FIG. 1, however the circuit configuration of the embodiment should not be restricted only to this, but it may be changed into other circuit configuration, such as, including one (1) set of the antenna 1 and the tuner 2, etc.

<Embodiment 2>

Figure 3:
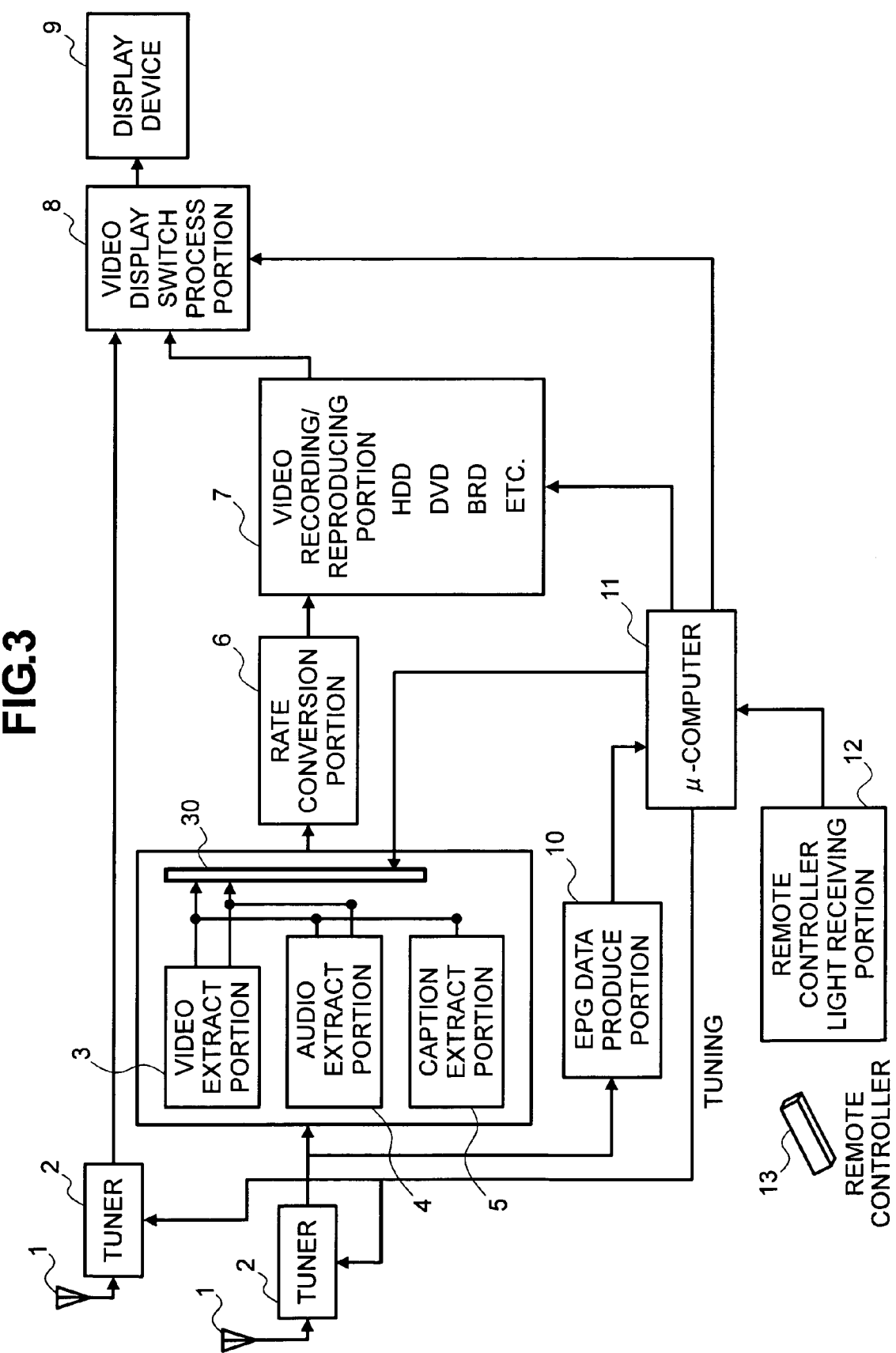
FIG. 3 is a circuit diagram of a television receiver, including therein a video recording/reproducing apparatus, according to an embodiment 2 of the present invention.

FIG. 3 shows the configuration of the television receiver including therein the video recording/reproducing apparatus, according to an embodiment 2 of the present invention. In this embodiment 2 shown in FIG. 3, among the MPEG2-TS signal, recording is made on the Video signal 21 and the Audio signal 22, but not the data broadcasting (BML) and the other data signal. The caption signal 23 is selectable for the user, to be recorded or not.

In FIG. 3, from the MPEG2-TS signal received by the tuner 2, the Video signal 21 is extracted within the video extract portion 3 while the Audio signal 22 within the audio extract portion 4, and further the caption signal 23 is extracted within the caption extract portion 5. Those Video signal 21, Audio signal 22 and caption signal 23 are combined with one another, so as to produce TS' signal (TS'=video+audio+caption data). Also, the Video signal 21 extracted within the video extract portion 3 and the Audio signal 22 extracted within the audio extract portion 4 are combined with each other, so as to produce a TS" signal (TS"=video+audio).

The TS' signal and the TS" signal are inputted into a switching portion 30. When the user operates the remote controller 13 or the like, then a control signal transmitted from the remote controller 13 is received by the remote controller light receiving portion 12, and it is converted into an electric signal to be inputted into the microcomputer 11.

The microcomputer 11 is so constructed that it controls the exchange or switching of the switching portion 30, and therefore it is possible to make selection between the TS' signal (TS'=video+audio+caption data) and the TS" signal (TS"=video+audio) to be inputted into the switching portion 30. The TS' signal or the TS" signal, being selectively outputted, is conducted with rate conversion thereupon within the rate conversion portion 6, and thereafter the compressed TS' signal or the TS" signal is recorded into the video recording/reproducing portion 7. Or, the TS' signal or the TS" signal, being outputted selectively, is recorded directly within the video recording/reproducing portion 7, as it is, but not passing through the rate conversion portion 6.

With the embodiment 2, it is possible to record either the TS' signal or the TS" signal, selectively, into the video recording/reproducing portion 7, but excepting the BML signal 24 and the other data 25, from the MPEG2-TS signal. Therefore, it is possible to record the TS signal, being selected through operation made by the user, thereby recording programs as many as possible, with high picture quality, into a recording medium having the limited recording capacity. However, the circuit configuration shown in FIG. 3 is only for descriptive purpose, and therefore the circuit configuration for the user to selectively record either the TS' signal or the TS" signal should not be restricted only to that mentioned above.

<Embodiment 3>

Figure 4:
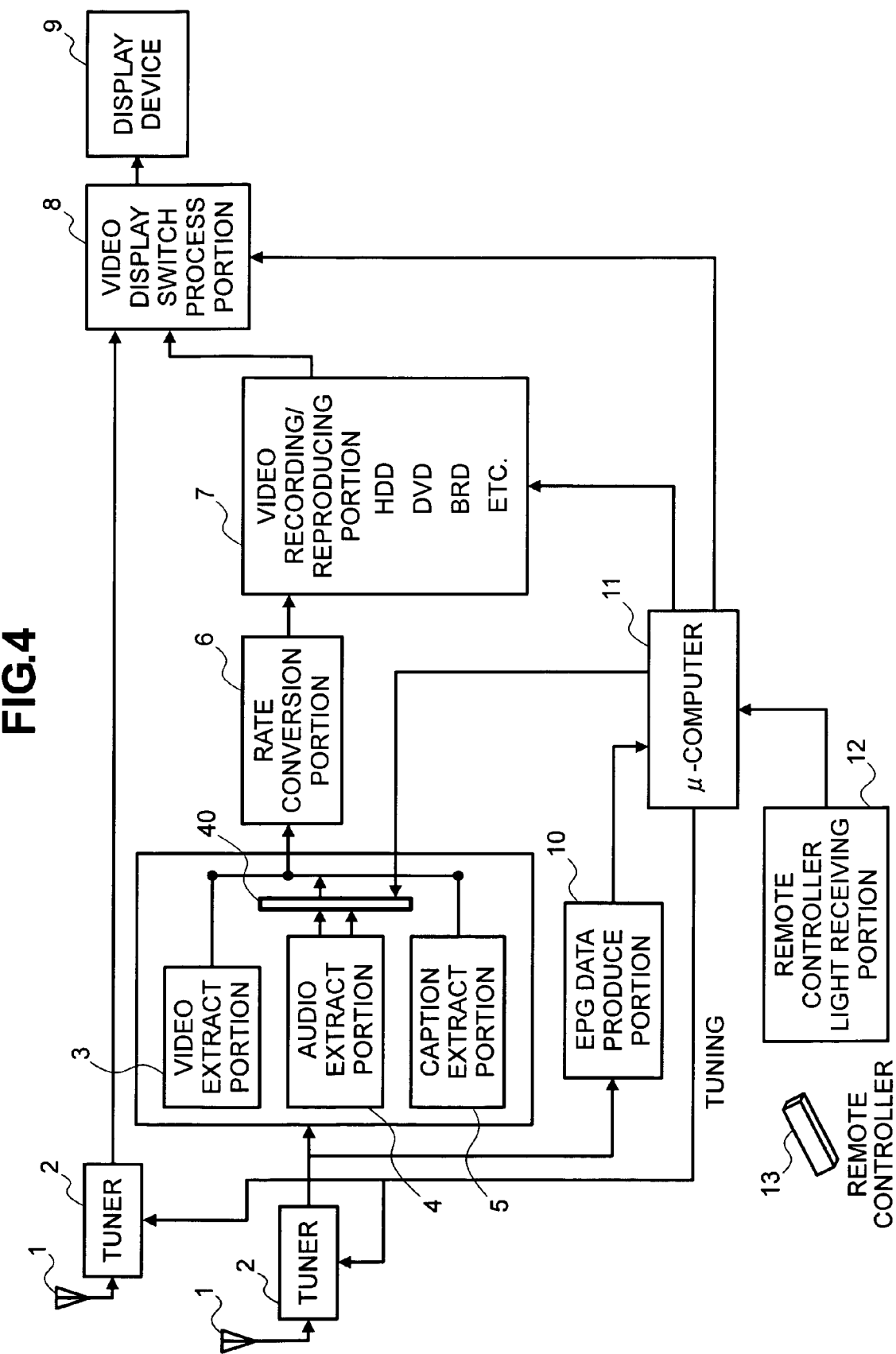
FIG. 4 is a circuit diagram of a television receiver, including therein a video recording/reproducing apparatus, according to an embodiment 3 of the present invention.

FIG. 4 shows the configuration of the television receiver including therein the video recording/reproducing apparatus, according to an embodiment 3 of the present invention. With the video recording/reproducing apparatus shown in this FIG. 4, only one of main audio/sub-audio is recorded through selection made by the user, in case where there are the main audio/sub-audio on the audio signal, and thereby reducing useless recording of the data. Also, it is possible to provide a mode for recording both the main audio/sub-audio.

In FIG. 4, the main audio signal and the sub-audio signal of the Audio signal 22 are separated from each other within the audio extract portion 4, to be inputted into an audio signal switching portion 40. The audio signal switch portion 40 outputs either one of the main audio/sub-audio or both thereof, in accordance with control of the microcomputer 11. The Video signal 21 extracted within the video extract portion 3 and the caption signal extracted within the caption extract portion 5, and also the main audio/sub-audio from the audio signal switching portion 40 are combined with one another, and thereby producing a TS'" signal. This combined TS'" signal is directly recorded into the into the video recording/reproducing portion 7, as it is, or after being converted in the rate thereof within the rate converter portion 6.

With the embodiment 3, in particular, in case when it is unnecessary to record either one of the main audio/sub-audio, then the TS'" signal, from which the either one of the main audio/sub-audio is deleted, is recorded; thereby enabling to record a large number of programs with high picture quality. However, the circuit configuration shown in FIG. 4 is only for descriptive purpose, and therefore the circuit configuration for selecting either one of the main audio/sub-audio or both thereof should not be restricted only to that mentioned above, but it is possible to adopt other various kinds of circuit configurations therein.

Figure 5:
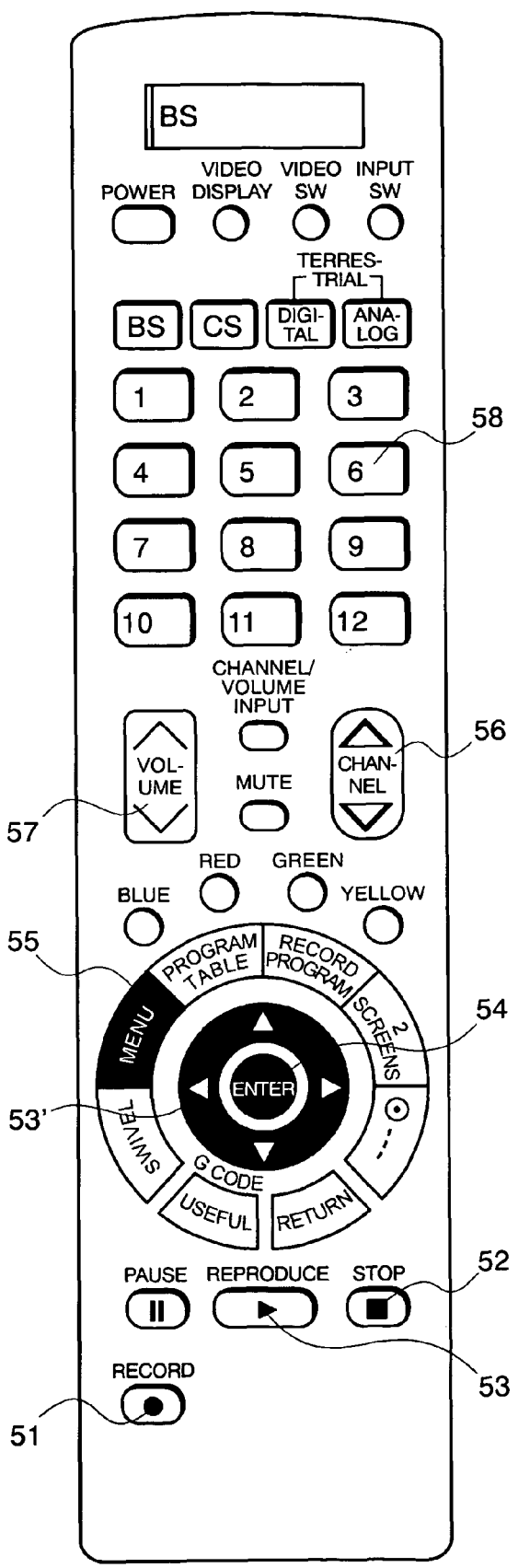
FIG. 5 is a view for shown an example of a remote controller to be used within the present invention.

FIG. 5 is a view show showing an example of a remote controller device to be applied into various embodiments of the present invention. The present remote controller device 51 comprises a record button 51, a stop button 52, a reproduce button 53, a select button 53', a decide button (or an enter button) 54, a menu button 55, an up/down button 56, an audio volume button 57, a channel button 58. Through operation of those buttons, through selection made by the user, it is possible to record only the data necessary to be recorded among the MPEG2-TS (Transport Stream) signal, on which the receiving process is treated. However, the remote control device shown in FIG. 5 is only an example, and therefore in the place thereof, it is also possible to make changes to use other remote controller devices having arbitrary configurations, or an operation device, which is provided on the main body of the video recording/reproducing apparatus.

<Embodiment 4>

Figure 6:
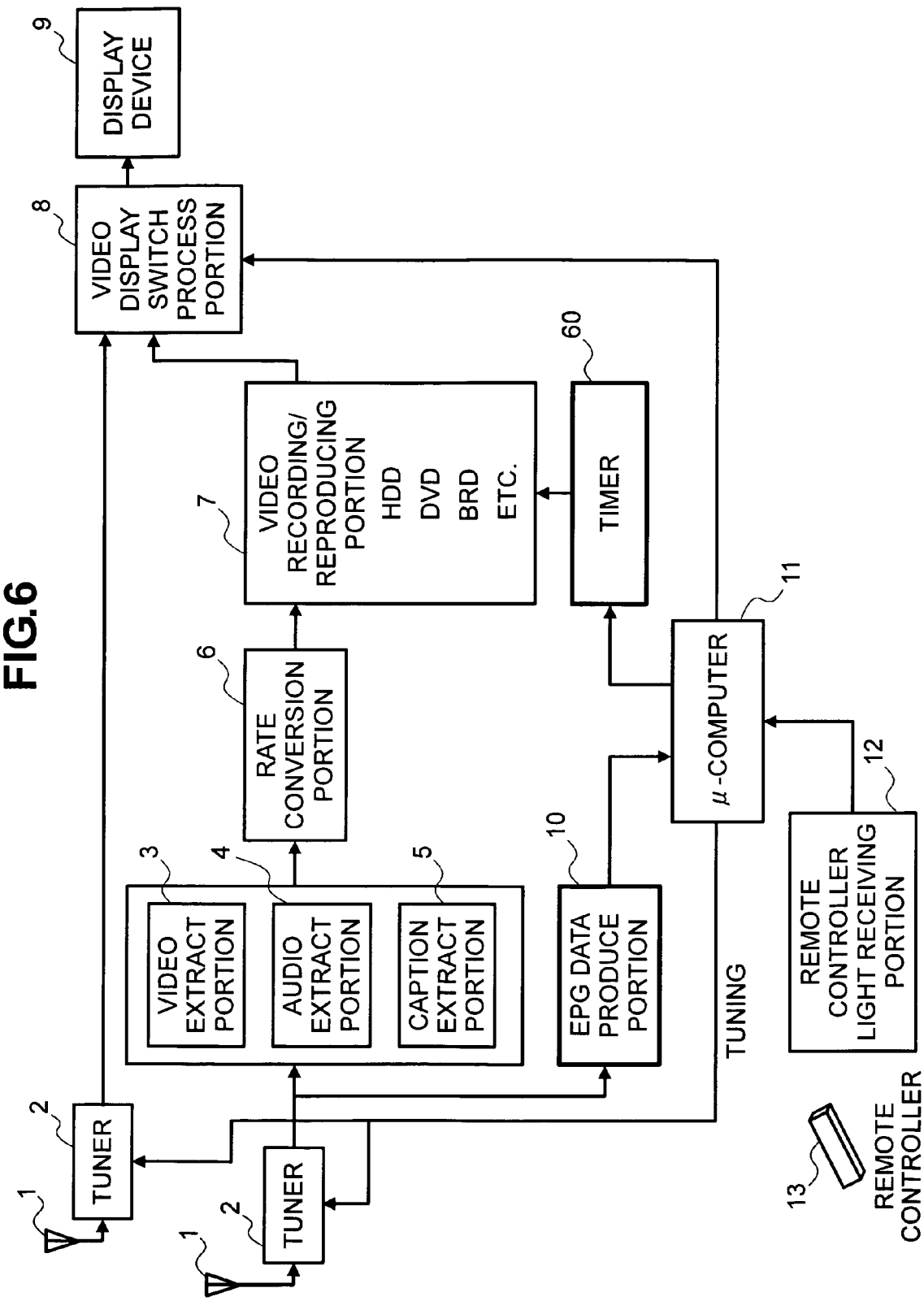
FIG. 6 is a circuit diagram of a television receiver, including therein a video recording/reproducing apparatus, according to an embodiment 4 of the present invention.

FIG. 6 shows the circuit configurations of the television receiver including therein the video recording/reproducing apparatus, according to an embodiment 4 of the present invention. With the present embodiment, there is provided a function of quick timer, for enabling to designate and set up a time-period until the time when recording is ended (i.e., selectable within a range from thirty (30) minutes up to six (6) hours), through continuous operation of the record button 51, which is provided on the main body of the video recording/reproducing apparatus. Further, according to the present embodiment, to that quick timer function is added a function of recording the program data "Until End of the Program" with using the program information of the digital broadcast.

This quick timer function is executed during when the user views the program (i.e., during the time-period when the program is displayed on the screen of the display device 9), and if the record button 51 is operated during when the program is displayed on the screen of the display device 9, that program is recorded. Even in the case when recording with using such the quick timer function, the data broadcasting is not recorded, in the similar manner to that of the embodiments 1 to 3 mentioned above.

In FIG. 6, the EPG data is produced within an EPG (Electronic Program Guide) data producing portion 10. Also, the EPG data producing portion 10 extracts program end-time data of the program from the EPG data, so as to output it to the microcomputer 11. This microcomputer 11 controls a timer 60 with using the program ending time data of the program, thereby controlling start/end of the recording operation of the video recording/reproducing portion 7.

In the embodiment 4, with an aid of the quick timer function through operation of the remote controller. 13, it is possible to record the program, which is displayed on the screen of the display device 9, for a predetermined time-period or until the end of that program. However, the quick timer function and the function of recording "Until End of the Program" may be achieved in other configurations, but not restricting to the configuration shown in FIG. 6. Also, with the information indicating the end-time of the program, it is possible to use other program end-time data available, but not restricting to that program end-time data within the EPG data.

FIG. 7(A) or 7(B) shows a remote controller to be used in operation of the quick timer function, or the record button and the stop button, which are provided on the main body of the video recording/reproducing apparatus. With the embodiment 4 of the present invention, pushing down the record button by a plural number of times enables the operation of setting the time until the end of recording, such as, "thirty (30) minutes", "one (1) hour", etc., as well as, the "Until End of the Program" of the quick timer.

FIG. 8 shows an example of the selection items of the quick timer, which are displayed when conducting the quick timer operation, wherein those selection items are selected at the optician of the user. Those selection items include two (2) kinds of items. In more details, as is shown by numerals (3) to (10) in the upper portion of FIG. 8 and the numerals (2) and (4) to (10), there is a first kind of items for designating a recording time from plural numbers of the times, which are determined in advance, and as is shown by (2) in the upper portion of FIG. 8 and (3) in the lower portion thereof, a second kind of items for recording a program at the desire until the end of the broadcasting thereof.

In FIG. 8 are shown an example: (1) "no display of quick timer" ; (2) "until end of the program" ; (3) "thirty (30) minutes" ; (4) "one (1) hour" ; (5) "one (1) hour and thirty (30) minutes" ; (6) "two (2) hours" ; (7) "three (3) hours" ; (8) "four (4) hours" ; (9) "five (5) hours", and (10) "six (6) hours". Herein, the "(1) no display of quick timer" is displayed in case when the recording is conducted without using the quick timer function.

For example, when pushing down the record button 51 by one (1) time, the program displayed thereon is recorded for nine (9) hours, and in this instance, none of those selection items (2) to (10) is displayed. Thus, the quick timer function relating to the present embodiment is executed by pushing down the record button 51 two (2) times. The selection items (2) to (10) mentioned above are not displayed on the same screen, according to the present embodiment, but they are switched over one by one depending on the number of times of operations of the record button 51 (i.e., the number of times of pushing down the record button). For example, when pushing down the record button 51 two (2) times, then the selection item, (2) "until end of the program", is displayed on the display device 9, such as, in the lower portion of the screen. Also, for example, when pushing down the record button 51 three (3) times, then the selection item "thirty (30) minutes" is displayed, also in the lower portion of the screen, but in the place of the "until end of the program". In the similar manner, for example, when pushing down the record button 51 six (6) times, then the selection item "two (2) hours" is displayed. And, when the user selects a selection item of her/his favorite to be displayed, by means of the record button 51, during the time when she/he is viewing a certain program, the time corresponding to the selection item displayed thereon is determined to be the recording time for that program. For example, when displaying the selection item, "two (2) hours", by pushing down the record button 51 six (6) times, then the recording operation is automatically ended after elapsing two (2) hours thereafter.

On the other hand, when selecting "until end of the program" by pushing down the record button 51 two (2) times, then the recording starts at a time point when the record button 51 is pushed down two (2) times, the recording operation is continued until the time when the broadcasting is ended of that program, being indicated by the program end-time data, which is extracted from the EPG data. And, while comparing that program end-time data to the timer within the apparatus, in case when both are coincide with, i.e., when it comes up to the end time of broadcasting of that program, then the recording operation is ended.

Within the present embodiment, when selecting "until end of the program", the recording is finished at the time indicated by the program end-time data, which is included within the EPG data. However, the recording may be ended, with using an end data indicative of the end of the program, which is added to the data stream of each of the programs. For example, when starting the recording while selecting "until end of the program", and detecting the above-mentioned end data, the recording operation may be ended responding to that.

However, FIG. 8 shows other example of displaying the selection items of the quick timer, in the upper and lower portions thereof, respectively. The second item, "until end of the program", is located at a top of the selection items, as is shown in the upper portion of FIG. 8. This is, because it can be considered to be the item that the user selects relatively often, therefore it is preferable to bring such the item to be selectable without necessitating a large number of operations thereof. Thus, according to the present embodiment, when the operation for actuating the quick timer function is conducted (i.e., the operation of pushing down the record button 51 two (2) times), firstly the "until end of the program" is displayed. Or, not firstly, but the "until end of the program" is displayed at the second time, as is shown in the lower portion of FIG. 8, it is preferable to display that selection item by the number of operations, as small as possible, as was mentioned above. Of course, as the example of displaying the selection items of the quick timer, it should not be restricted only to those shown in the upper stage and the lower stage, but it may be displayed in other way for displaying thereof.

However, in case when the program broadcasted is extended, since flag information for extension is transferred, at the latest thirty (30) seconds before the time when ending the program; therefore, detection of that flag enables to change setup of the ending time of recording corresponding to the extension time of the program. Also, it may be so constructed that the setup of the extension time can be controlled by a unit of one (1) minute, for example.

<Embodiment 5>

Figure 9:
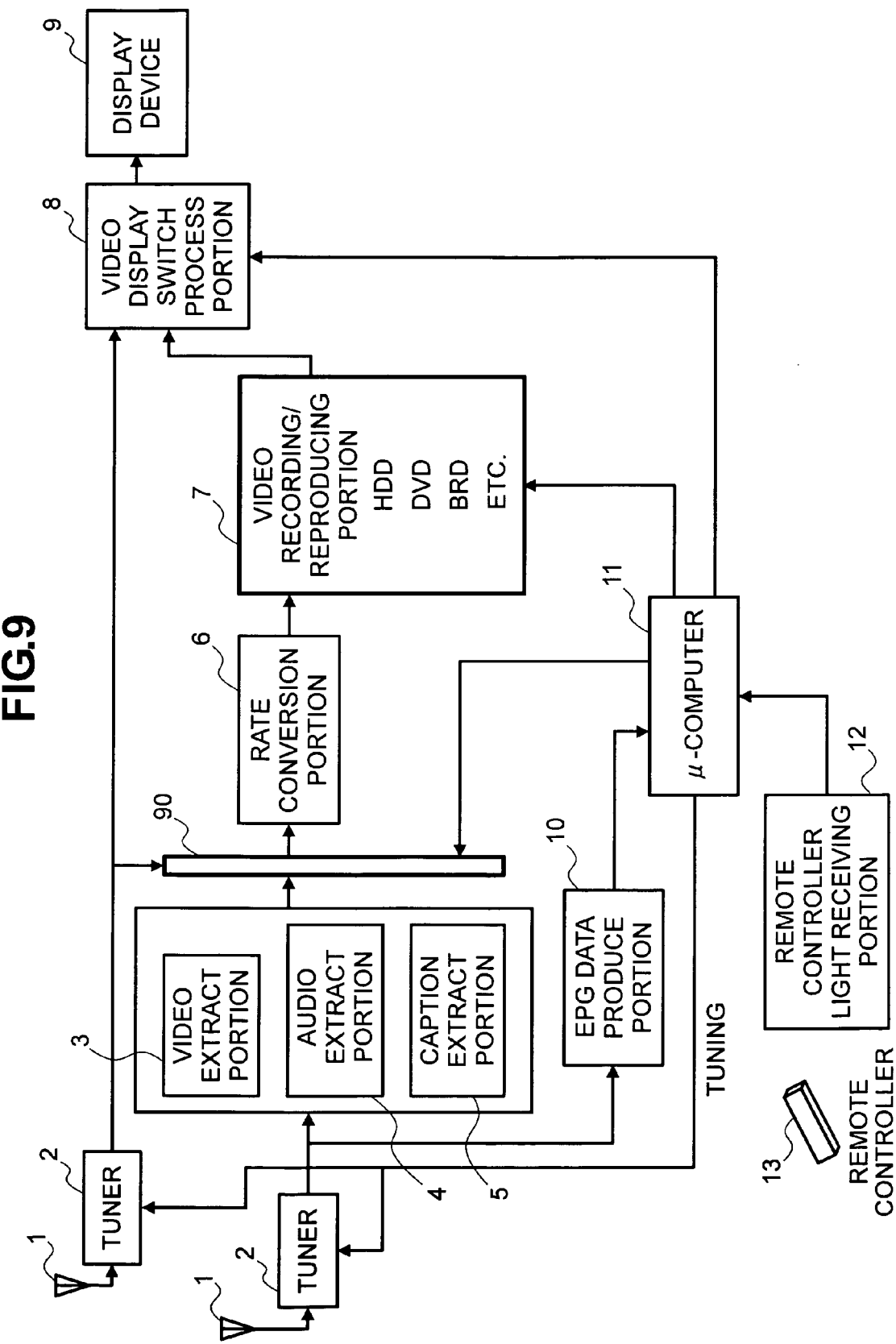
FIG. 9 is a circuit diagram of a television receiver, including therein a video recording/reproducing apparatus, according to an embodiment 5 of the present invention.

FIG. 9 shows the structure diagram of the television receiver including therein the video recording/reproducing apparatus, according to a embodiment 5 of the present invention. With the embodiment 1 shown in this FIG. 9, it is possible for the user to make section between a first mode for recording the MPEG2-TS (Transport Stream) signal and a second mode for recording the TS' signal (TS'=video+audio+caption). Thus, in that second mode, for recording but except for the data broadcasting, the fundamental operations in that instance are similar to those of the embodiment 1 shown in FIG. 1.

In FIG. 9, the signal received by the antenna 1 is treated with the receiving process within the tuner 2, and it is displayed on the display device 9 in the form of a picture thereof, as being the MPEG2-TS (Transport Stream) signal, through the video display switch process portion 8. At the same time, the signal received by other one antenna 1 is treated with the receiving process within the tuner 2, to be the MPEG2-TS (Transport Stream) signal, i.e., the receiving data of the high-definition television digital broadcast signal; however, the Video signal 21 is extracted within the video extract portion 3, the Audio signal 22 is extracted within the audio extract portion 4, and the caption signal 23 is extracted within the caption extract portion 5. Those Video signal 21, Audio signal 22 and extract signal 23 are combined with one another, to be the TS' signal (TS'=video+audio+caption data).

In the embodiment 5 shown in FIG. 9, the MPEG2-TS (Transport Stream) signal and the TS' signal (TS'=video+audio+caption data) are inputted into a switch 90. The user can select between the first mode for recording the MPEG2-TS signal (i.e., recording including the data broadcasting therein) and the second mode for recording the TS' signal (i.e., recording except for the data broadcasting). Thus, the user can determine on which one of the MPEG2-TS signal and the TS' signal should be selected, through button operations of the remote controller or the operations on a menu screen. The microcomputer 11, being constructed so as to conduct switching control of a switching portion 90, can selectively output either one of the MPEG2-TS signal and the TS' signal (TS'=video+audio+caption data), which are inputted into the switching portion 90. After being converted in the rate within the rate conversion portion 30, the TS signal or the TS' signal, which is selectively outputted, the compressed TS signal or the TS' signal is recorded within the video recording/reproducing portion 7. Or, alternatively, the compressed TS signal or the TS' signal, being selectively outputted, is recorded within the video recording/reproducing portion 7, directly as it is, but without passing through the rate conversion portion 30.

With the embodiment 5 of the present invention, it is possible for the user to selectively record the MPEG2-TS signal or the TS', being obtained the BML signal 24 and the other data signal 25 from the MPEG2-TS signal, into the video recording/reproducing portion 7. Accordingly, the user can select the first mode when she/he wishes to record the data broadcasting, being low in the immediateness or instantaneousness thereof, such as, an advertisement, for example, or the second mode when she/he does not. For this reason, according to the present embodiment, it is possible to record a large number of programs, at high picture quality, with using the recording medium being limited in the recording capacity thereof.

However, the circuit configuration shown in FIG. 9 is only for descriptive purpose, and therefore the circuit configuration, for the user to selectively record the TS' signal or the TS" signal, should not be restricted only to that mentioned above, but it may be modified into other circuit configuration.

<Embodiment 6>

Figure 10:
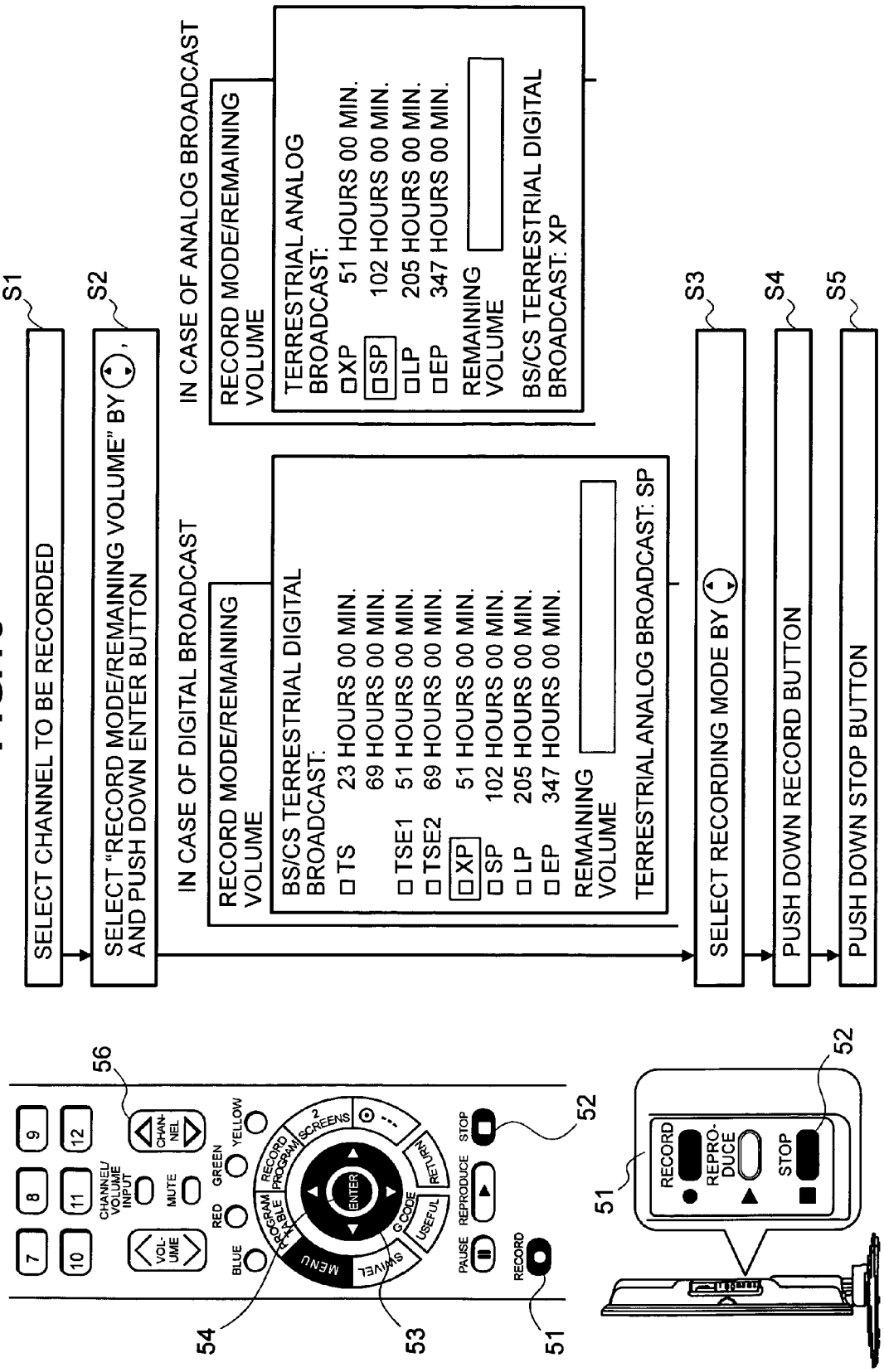
FIG. 10 is a view for showing selecting steps for each of video recording mode in an embodiment 6 of the present invention.
Figure 12:
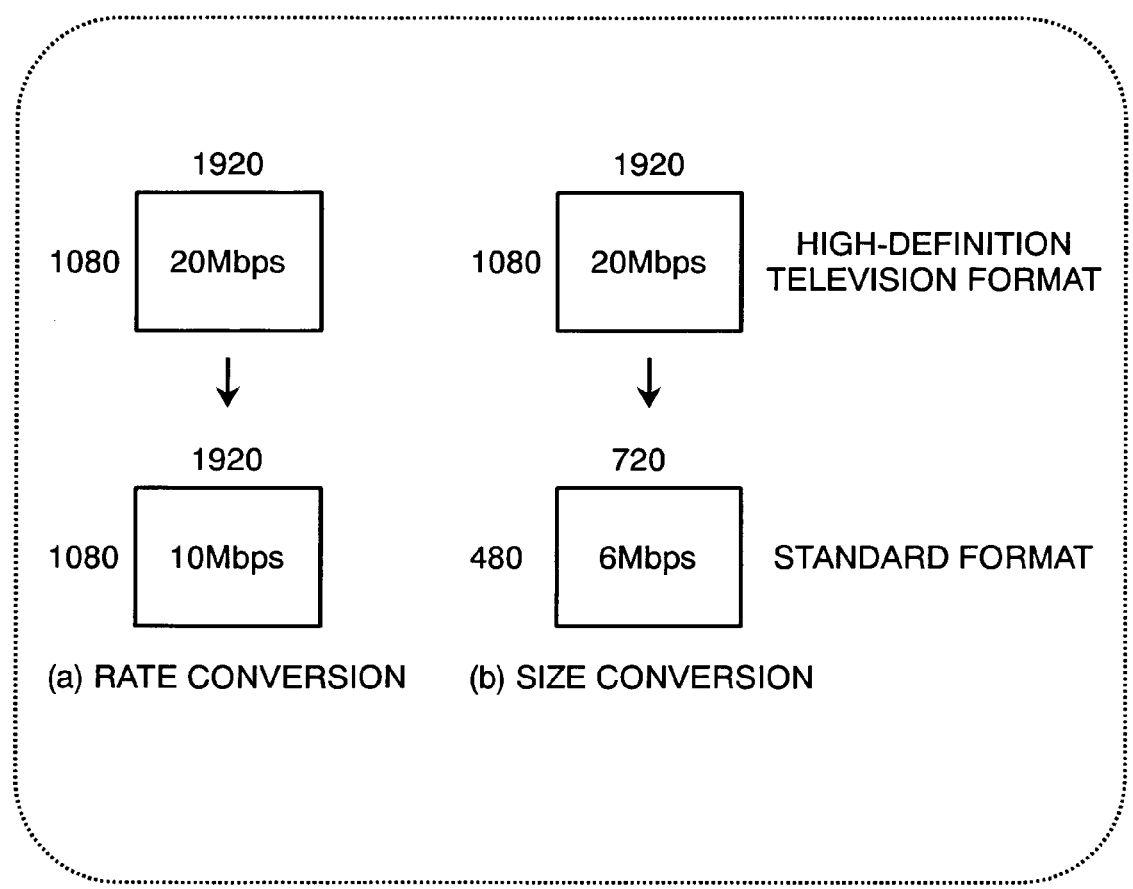
FIG. 12 is a view for showing a rate conversion technology and a size conversion technology in relation to the conventional arts.

FIG. 10 shows steps for selecting each of the recording modes, within an embodiment 6 of the present invention. Also, FIG. 11 is a table for showing an example of recording times in the recording mode. With this embodiment 6, being built up with combining the components shown in the embodiments 1 to 5, it is possible for the user to select one from various kinds of recording modes, such as, a TS mode, a TSE1 mode, a TSE2 mode, a XP mode, etc. In FIG. 10 are shown various kinds of buttons provided on the remote controller 13 or the main body of the video recording/reproducing apparatus, which are operated when the user makes selection on the various kinds of modes, and also sequence of steps of operation in case when the user makes selection on the various kinds of modes.

In FIG. 10, firstly in a step S1, selection is made on a channel to be recorded through operation of the up/down button 56. Next, in a step S2, after selecting the "recording mode/remaining volume" with using the select button 53, the decide (or enter) button 54 is pushed down, so as to display a menu selection screen for the recording mode. In a step S3, while pushing down the selection button 53 to move a cursor up or down, selection is made on the recording mode at the desire. Then, in a step S4, when pushing down the record button 51, recording is conducted of the desired mode. In case when trying to stop the recording, the recording is stopped when pushing down the stop button 52 in a step S5.

FIG. 11 shows an example of various kinds recording mode and the recording times, in case of a digital broadcast and an analog broadcast. Selection can be made for the user, among the TS mode for recording the MPEG2-TS (Transport Stream) signal, the TSE1 mode for selectively recording the necessary signal (s) within the MPEG2-TS (Transport Stream) signal and the TSE2 mode, etc. However, XP, SP, LP and EP modes are not the mode for recording the TS, but for recording the TS, which is converted into the digital signal compressed and coded, again, after being demodulated into an analog signal once.

In this embodiment 6, with addition of the "TSE" modes for high-compression high-definition television, in accordance with the high-efficiency stream compression technology, it is possible to achieve a long-time recording, for a HDD of 500 GB in capacity thereof, such as, for about fifty (50) hours on BS digital broadcasting of the high-definition television program, with suppressing deterioration in the picture quality thereof to be the minimum, or about seventy (70) hours on digital terrestrial broadcasting.

However, the TS mode and the TSE modes, etc., shown in the embodiment 6 are only for illustration purpose, and the recordable times thereof are also only for illustration purpose. With the various kinds of modes to be adopted or the recordable time thereof in such the case, they may be set up by changing into other kinds and other values thereof, within a region of the present invention.

While we have shown and described several embodiments in accordance with our invention, it should be understood that disclosed embodiments are susceptible of changes and modifications without departing from the scope of the invention. Therefore, we don not intend to be bound by the details shown and described herein but intend to cover all such changes and modifications that fall within the ambit of the appended claims.

What is claimed is:

1. A video recording/reproducing apparatus configured to record a transport stream included within a digital broadcasting signal, with or without compression thereof, the video recording/reproducing apparatus comprising:
a receiver portion, configured to receive the transport stream of data in the digital broadcasting signal, including: video data, audio data, caption data, and data of a data broadcasting; and a recording portion, configured to record to a recording medium having a limited recording space, under a recording mode, selected from at least: a first recording mode of high vision recording, and a second recording mode of high vision recording with a higher compression than the first recoding mode; wherein when the first recording mode is selected, the recording portion records the transport stream of data received by the receiver portion, including: the video data, the audio data, the caption data, and the data of the data broadcasting; and wherein when the second recording mode is selected, the recording portion records the video data, the audio data, and the caption data, and automatically discards the data of the data broadcasting from the transport stream received by the receiver portion.

2. A video recording/reproducing apparatus configured to record a transport stream included within a digital broadcasting signal, the video recording/reproducing apparatus comprising: a receiver portion, configured to receive the transport stream of data in the digital broadcasting signal, including: video data, audio data, caption data, and data of a data broadcasting; an extractor portion, configured to extract a transport stream of video data, audio data, and caption data from the transport stream, and to automatically discard the data of the data broadcasting from the transport stream; and a recording portion, configured to perform a recoding operation to a recording medium having a limited recording space, under one of at least: a first recording mode, and a second recoding mode for recoding under a higher compression than that of the first recording mode, as a recoding mode for directly recoding the received transport stream; wherein when the first recoding mode is selected, the recoding portion is configured to record the transport stream, including: the video data, the audio data, the caption data, and the data of the data broadcasting, without deleting the data of the data broadcasting by the extractor portion; and wherein when the second recording mode is selected, the recoding portion is configured to record the transport stream of the video data, the audio data, and the caption data which are extracted by the extractor portion, and to automatically discard the data of the data broadcasting.

3. A video recording/reproducing apparatus configured to record a transport stream included within a digital broadcasting signal, the video recording/reproducing apparatus comprising: a receiver portion, configured to receive the transport stream of data in the digital broadcasting signal, including: video data, audio data, caption data, and data of a data broadcasting; and a recording portion, configured to record, to a recording medium having a limited recording space, data received by the receiver portion, including: video data, audio data, caption data, and data of a data broadcasting; wherein the recording portion is configured to perform a recording operation under one of at least: a first recording mode and a second recording mode for recording under a higher compression than that of the first recording mode, as a recoding mode for recording the digital broadcasting signal; and wherein when the first recording mode is selected, the recording portion records the transport stream of data received by the receiver portion, including: the video data, the audio data, the caption data, and the data of the data broadcasting; and wherein when the second recording mode is selected, the recording portion records the video data, the audio data, and the caption data, and automatically discards the data of the data broadcasting from the transport stream received by the receiver portion.

4. The video recording/reproducing apparatus, as described in the claim 3, wherein the data of the data broadcasting includes Broadcast Markup Language (BML).

5. The video recording/reproducing apparatus, described in the claim 1, wherein main audio and/or sub-audio among the audio data is recorded in the recording portion, based on a selection by a user.

6. The video recording/reproducing apparatus, described in the claim 1, wherein the recording mode, and a remaining amount of recordable time during which recoding can be made on a recoding medium under the recording mode, are outputted to a display apparatus.

7. The video recording/reproducing apparatus, described in the claim 1, wherein the data of the data broadcasting includes Broadcast Markup Language (BML).

8. The video recording/reproducing apparatus, described in the claim 2, wherein main audio and/or sub-audio among the audio data is recorded in the recording portion, based on a selection by a user.

9. The video recording/reproducing apparatus, described in the claim 2, wherein the recording mode, and a remaining amount of recordable time during which recoding can be made on a recoding medium under the recording mode, are outputted to a display apparatus.

10. The video recording/reproducing apparatus, described in the claim 2, wherein the data of the data broadcasting includes Broadcast Markup Language (BML).

11. The video recording/reproducing apparatus, described in the claim 3, wherein main audio and/or sub-audio among the audio data is recorded in the recording portion, based on a selection by a user.

12. The video recording/reproducing apparatus, described in the claim 3, wherein the recording mode, and a remaining amount of recordable time during which recoding can be made on a recoding medium under the recording mode, are outputted to a display apparatus.

* * * * *